Figure 6:
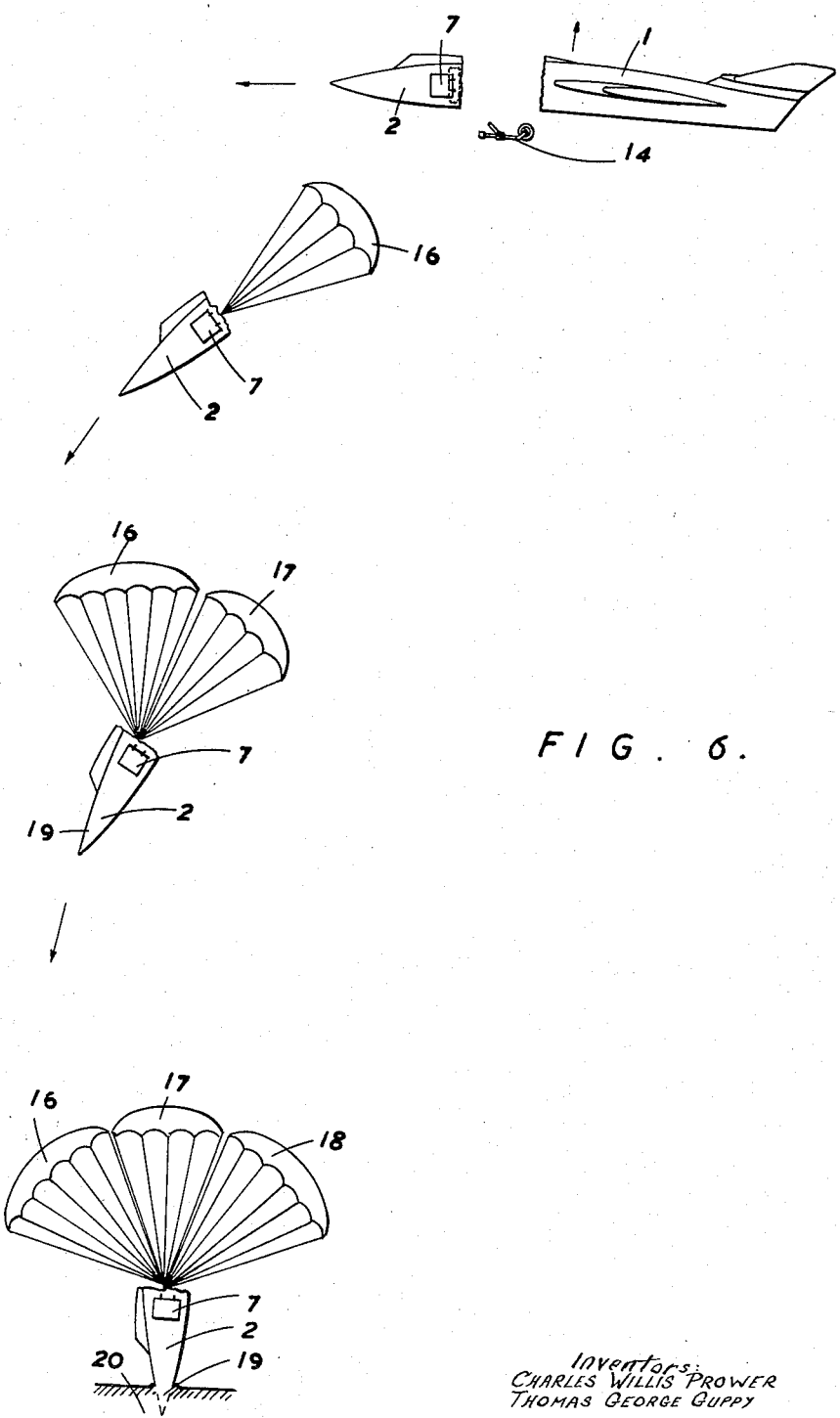

April 8, 1952　　C. W. PROWER ET AL　　2,591,867
DETACHABLE PILOT'S COCKPIT FOR AIRCRAFT
Filed June 13, 1950　　3 Sheets-Sheet 1
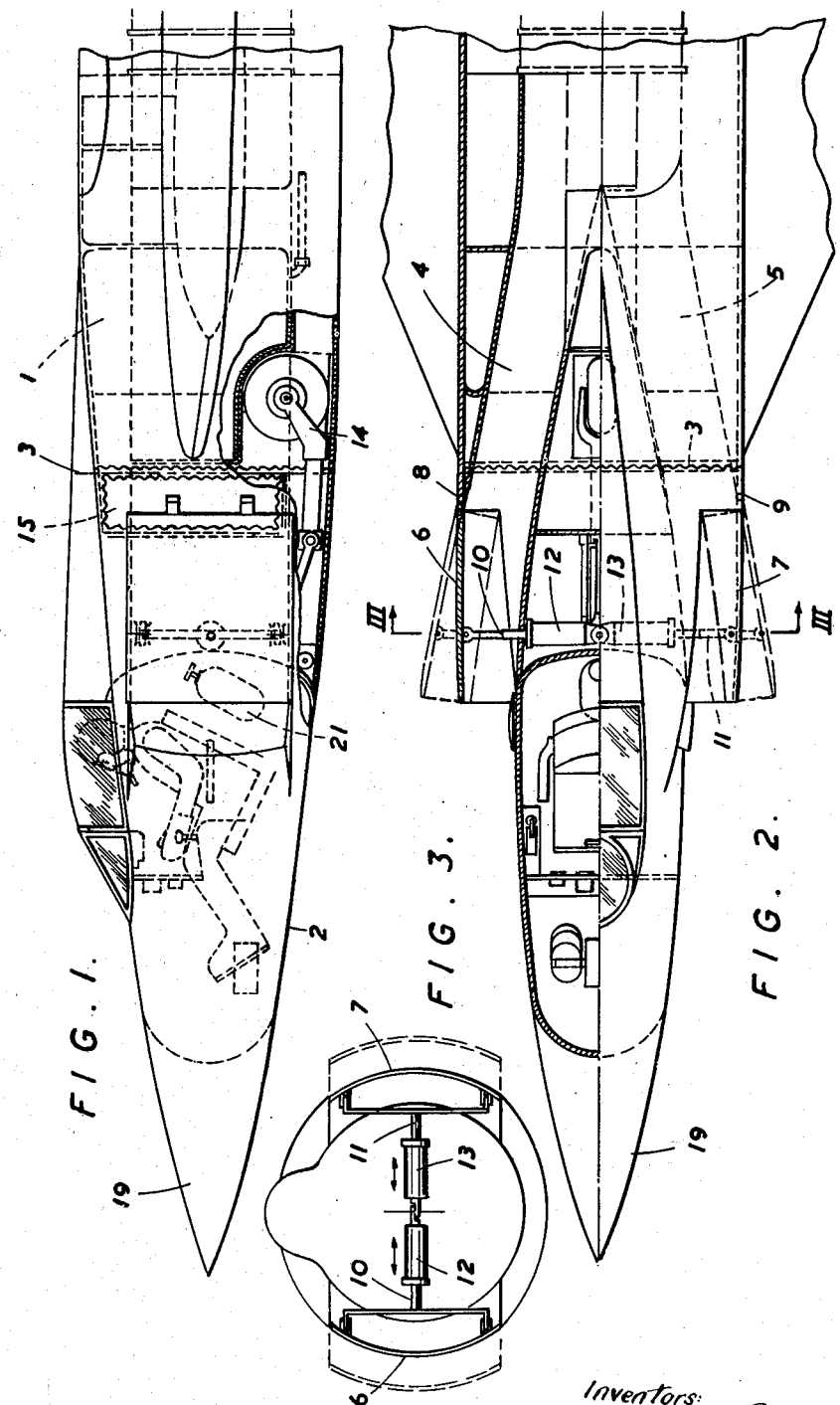
Inventors:
CHARLES WILLIS PROWER
THOMAS GEORGE GUPPY
By Richardson, David and Nordon
Attorneys

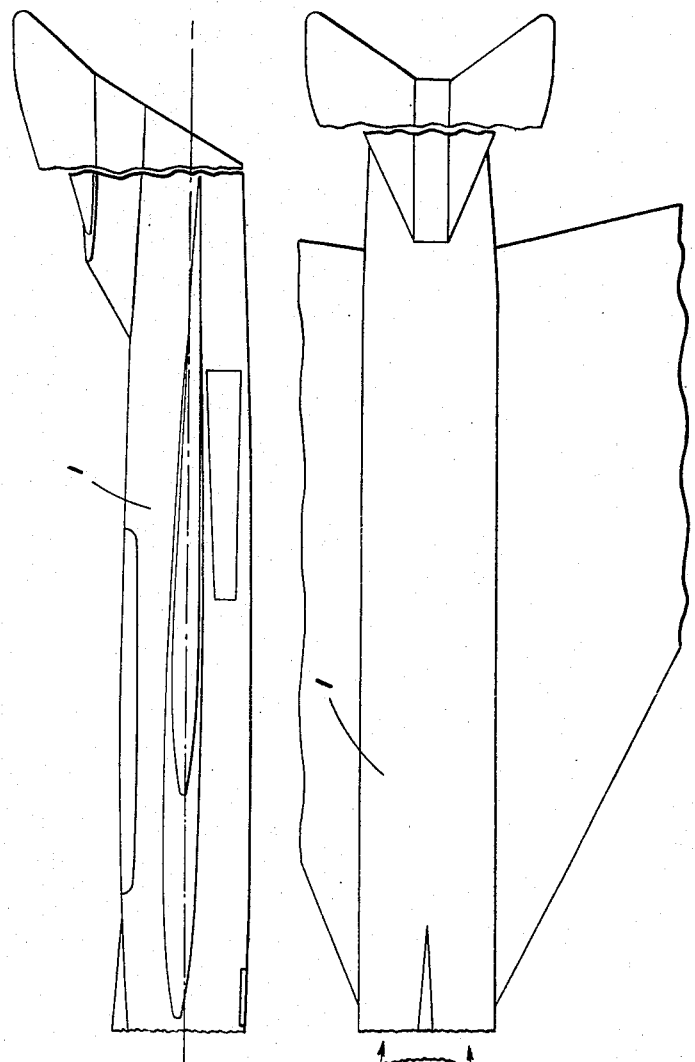
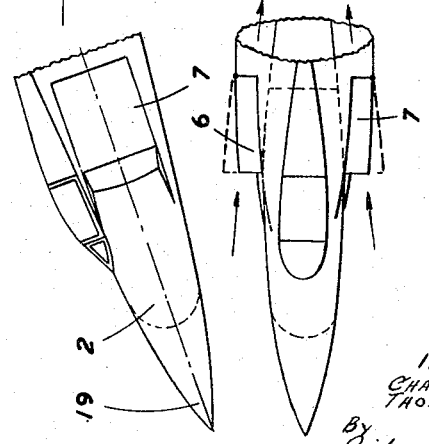
FIG. 4
FIG. 5

Patented Apr. 8, 1952

2,591,867

UNITED STATES PATENT OFFICE 2,591,867

DETACHABLE PILOT'S COCKPIT FOR AIRCRAFT

Charles Willis Prower, East Molesey, and Thomas George Guppy, Hanwell, London, England, assignors to Blackburn and General Aircraft Limited, Brough, England, a British company Application June 13, 1950, Serial No. 167,732
In Great Britain April 29, 1949

3 Claims. (Cl. 244—140)

This invention relates to aircraft and particularly to aircraft intended for operation at comparatively high speeds and at high altitudes, such as, for example, fighter aircraft propelled by turbo-jet, turbo-prop, rocket or other propulsion units capable of operating the aircraft at a speed and height such that it would be extremely hazardous for the pilot or other occupant in an emergency to attempt to escape from the aircraft in the usual way even with the help of an ejector seat. It is proposed, therefore, to utilise the known idea of a jettisonable sealed cockpit. Such arrangement has, if it is so desired, the advantage of enabling the pilot to escape from the jettisonable cockpit when the latter has reached a lower altitude and a speed which will allow him to bale out in the usual way, and also has another advantage, that of enabling the complete range of instruments which may include instruments of an experimental nature to be salvaged intact with any data which had been compiled during a test flight.

It is desirable that such a cockpit after jettisoning shall have a sufficient degree of directional and longitudinal stability to prevent pitching and yawing motions, which would bring into play large aerodynamic forces and attendant dangerous accelerations. One of the objects of the present invention therefore is to evolve an arrangement having this desirable feature.

According to the present invention the detachable cockpit is made nose heavy and is formed with passages towards its rear through which air may flow on its being detached from the fuselage to give a degree of stability in pitch and yaw. Such passages may be normally open or they may be opened on or immediately prior to the breaking away of the cockpit and, according to a further feature of the present invention, air inlet openings and parts of air ducts leading to the power unit or units are disposed symmetrically on each side of the cockpit and break away therewith so that the stabilising air flows therethrough.

The invention is particularly applicable to aircraft of the kind which includes a fuselage containing one or more propulsion units and including a cockpit situated in the nose when the fuselage is provided with laterally disposed air inlet openings on opposite sides immediately to the rear of the pilot which serves to conduct air to the power unit or units in the fuselage through suitably arranged air ducts.

Still further according to the present invention, the air inlet openings are each provided with a hinged wall which may be swung outwardly to allow more air through the parts of the air ducts. These walls may be swung out by means of jacks when the arrangement may be such that an excess movement of the jacks will further swing out such walls to increase the drag set thereof after break-away of the cockpit and so decelerate it.

The cockpit due to its nose heaviness will take a downward path clear of the rest of the aircraft and the latter due to the sudden rearward movement of the centre of gravity resulting from it being relieved of the weight of the cockpit tends to follow an upward path well clear of the falling cockpit.

In order to maintain the centre of gravity of the cockpit sufficiently far forward in the case of a fighter aircraft having the guns attached to the rear of the cockpit, it is proposed to fit the guns on a sub-frame in the rear of the cockpit so that such parts, together with the ammunition belts, may be jettisoned at or prior to detachment of the cockpit from the fuselage.

It is also proposed that any other unwanted mass such as a nose landing wheel mounted in the cockpit should similarly be jettisoned at or prior to the break away.

Separation of the cockpit from the fuselage may be effected in any suitable way, such for example, as by suitably positioned charges which can be ignited electrically or in any other suitable manner.

It is intended that the final stage in an emergency descent shall be retarded by a cluster of parachutes or drogues normally housed in the tail of the cockpit which may be brought into operation in succession or in any desired sequence to give the required gradual reduction in speed of the cockpit in a forward and downward direction. Alternatively the cockpit may incorporate one or more rotors the blades of which will be flung outwardly by centrifugal force and will autorotate to produce an oppositely directed thrust to reduce the downward velocity to an amount such that it will be safe for the pilot to remain in the cockpit until the latter reaches the ground or will enable him to bale out in the usual way when the speed and height of the cockpit from the ground has reached a safe figure.

In order that the invention may be clearly understood and readily carried into effect one convenient embodiment thereof is by way of example hereinafter more fully described with reference to the accompanying drawings which are given for purposes of illustration only and not of limitation.

In these drawings:

Figure 1 is a side elevation of the fore part of an aircraft fuselage showing the detachable cockpit, Figure 2 is a half sectioned plan view looking down on Figure 1, Figure 3 is a transverse section on the line III—III of Figure 2, Figure 4 is a side elevation of the aircraft with the cockpit shown detached therefrom, Figure 5 is a plan view looking down on Figure 4, and Figure 6 is a view showing the separation of the cockpit from the fuselage and the stages of its descent.

Referring now to the said drawings, and in particular to Figures 1 and 2 thereof, the aircraft fuselage 1 has its nose formed as a detachable cockpit 2 which may break away from the fuselage on the line 3.

The fuselage contains a turbo-compressor power unit, the air for which is supplied by ducts 4, 5 provided in the fuselage 1. These ducts are continued to each side of the detachable cockpit 2 and at their forward extremity are provided with curved external walls 6, 7 (see also Figure 3) hinged to the extremities of the ducts at 8, 9 respectively such that these duct extensions and the hinged external walls form passages through which air flows on break away of the cockpit. The leading edges of these walls in normal position form the rim, or the major portion of the rim, of air intakes to the ducts of cross-sectional areas less than the cross-sectional areas of the ducts 4, 5, and when these walls 6, 7 are swung outwardly about their hinges 8, 9 into the positions shown in broken lines, they increase the frontal cross-sectional areas to the full cross-sectional areas of the ducts so that additional air may flow therethrough normally to supply more air to the propulsion unit and on break away of the cockpit to increase the stabilising effect.

The external walls 6, 7 are moved from their normal position shown in full line in Figure 2 to their normally extended position, shown in broken line, by the rams 10, 11 respectively of hydraulic jacks 12, 13, when the arrangement may be such that an excess movement of the rams 10, 11 may further swing out the hinged external walls 6, 7 to create a drag which will assist in decelerating the cockpit after its break away from the fuselage.

A plurality of parachutes or drogues in a pack 15 are provided at the rear of the cockpit 2 and adapted to be released either manually or automatically after break away of the cockpit.

Explosive charges which may be fired electrically or by other such means are disposed along the line 3 so that when the same are fired or otherwise actuated a break-away occurs between the cockpit 2 and the fuselage 1 as shown in Figures 4 and 5, from an examination of which it will be appreciated that at the break-away the front parts of the ducts 4, 5 with their hinged side walls 6 and 7 break away with the cockpit 1, so that air continues to flow therethrough and thereby stabilises the cockpit in pitch and yaw.

At the break away any unnecessary mass, such as guns and ammunition or, as illustrated, a nose landing wheel 14 provided at the rear of the cockpit 2, is jettisoned so that the cockpit is kept nose heavy. This is illustrated in Figure 6 where, at the top, the cockpit 2 is shown at the time of break away from the fuselage 1 with jettisoning of the nose landing wheel 14. Stabilised by the flow of air through the ducts, which may if desired be increased by swinging out the hinged walls 6, 7 and due to its nose heaviness, the cockpit 2 takes a forward downward path, whilst the fuselage 1, due to the sudden rearward movement of the centre of gravity, tends to take an upward path as indicated by the arrows so that the fuselage follows a path well clear of the falling cockpit.

The parachutes in the pack 15 are released one at a time or in predetermined order to retard the descent of the cockpit 2. Thus, as illustrated in Figure 6, a first parachute 16 is released and then a second parachute 17 whilst later a third parachute 18 is released so that the descent of the cockpit 2 is reduced to a safe speed for landing with its nose fairing 19 crumpling on impact or penetrating the ground 20 substantially as illustrated in Figure 6.

The pilot may remain in the cockpit to escape therefrom after it has landed or he may bale out after the cockpit has descended into the denser air region and after its speed has been sufficiently reduced to make such escape from the cockpit safe.

The cockpit can of course be sealed to ensure a sufficient supply of pressurised air to the pilot during emergency descent, or conveniently his supply of oxygen may be obtained from a bottle 21 carried in the cockpit 2.

In the drawings, as will be appreciated from an examination of the Figures 4 and 5, the invention is shown applied to a fixed wing aircraft having a substantially delta shape wing plan form and a separate empenage, but it will be appreciated that the invention is applicable to all types of high speed aircraft in which air intake ducts or extensions thereof may be provided symmetrically conveniently on each side of a detachable cockpit so that the invention is especially applicable to hinged wing high speed aircraft.

We claim:

1. In an aircraft, a cockpit capable of being detached from the fuselage in an emergency, and of travelling horizontally for a space, means tending to make said cockpit nose heavy when separated from said fuselage, and elongated passages formed along the longitudinal portions of said cockpit at the rear thereof through which air may flow on said cockpit being detached from said fuselage to give a degree of stability in pitch and yaw.

2. In an aircraft as claimed in claim 1, a hinged wall to each of said passages and means for swinging out said hinged wall from its normal to a projecting position, whereby to increase air flow through said passages for stabilization.

3. In an aircraft as claimed in claim 1, including a power unit for propulsion thereof and air ducts feeding said power unit, air inlet opening members and elongated passages forming parts of said air ducts leading to said power unit, symmetrically and longitudinally disposed each side of the cockpit and means for causing said inlet opening members and said elongated passages to break away with the cockpit, so that the stabilizing air can flow therethrough after said cockpit has become a free flight vehicle.

CHARLES WILLIS PROWER.
    THOMAS GEORGE GUPPY.

REFERENCES CITED

The following references are of record in the file of this patent:

UNITED STATES PATENTS

| Number | Name | Date |
| --- | --- | --- |
| 1,383,124 | Jordan | June 28, 1921 |
| 2,439,236 | Brown et al. | Apr. 6, 1948 |

FOREIGN PATENTS

| Number | Country | Date |
| --- | --- | --- |
| 233,494 | Switzerland | Nov. 1, 1944 |

OTHER REFERENCES

"Time" magazine, issue of November 1, 1948; page 70.

"Aviation Week" magazine, issue of April 3, 1950; page 28.